Nov. 21, 1967    L. E. FULLER    3,353,252
POWER OPERATED APPLICATOR TOOL FOR PIPE PROTECTORS
Filed Aug. 26, 1965    3 Sheets-Sheet 1

LAWRENCE E. FULLER
INVENTOR.

BY John O. Evans, Jr.

ATTORNEY

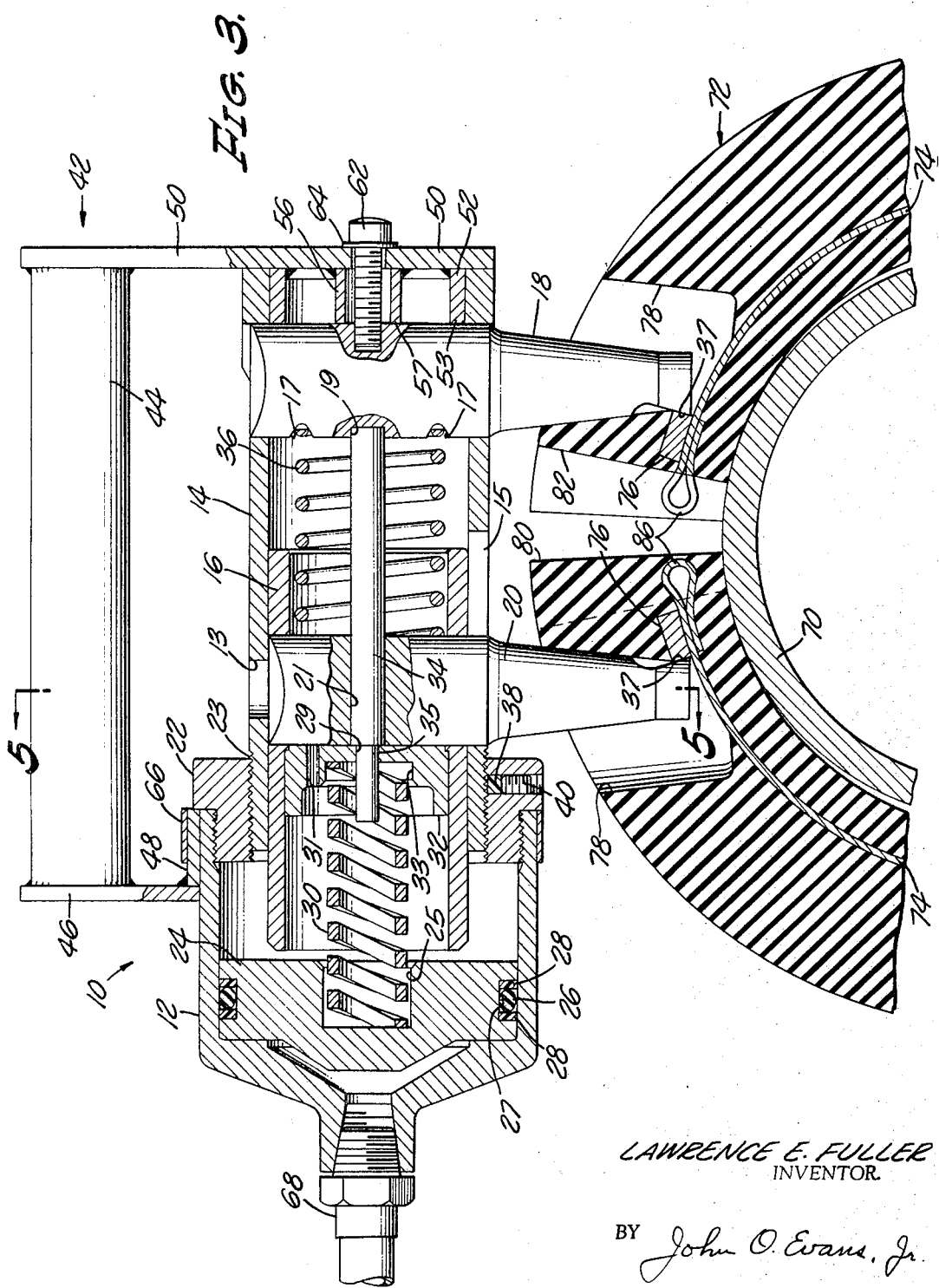

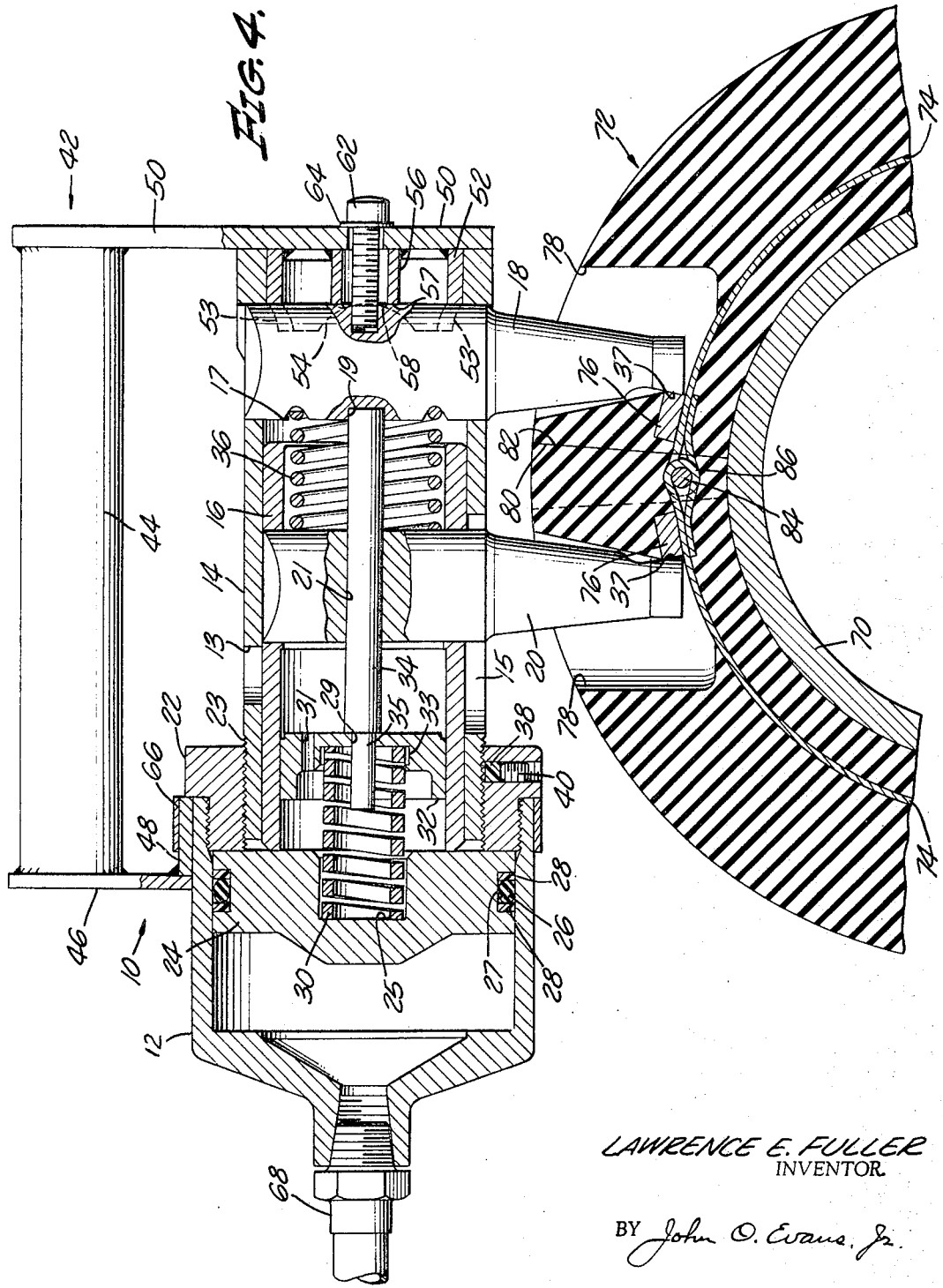

United States Patent Office 3,353,252
Patented Nov. 21, 1967

3,353,252
POWER OPERATED APPLICATOR TOOL FOR PIPE PROTECTORS
Lawrence E. Fuller, Whittier, Calif., assignor to Byron Jackson, Inc., Long Beach, Calif., a corporation of Delaware
Filed Aug. 26, 1965, Ser. No. 482,793
4 Claims. (Cl. 29—236)

ABSTRACT OF THE DISCLOSURE

A power-operated tool for constricting a split sleeve about a pipe, and having a jaw subassembly including a pair of aligned fixed and movable jaws, normally spaced apart, but movable toward one another on application of pressure against the piston of a fluid cylinder adjustably attached to the subassembly, the adjustment providing a variable stop for the piston travel to regulate the spacing between the constricting pair of jaws in their closed positions.

---

This invention relates generally to tools for installing onto pipe flexible split collars, and particularly to power-operated tools for constricting split drill pipe protectors onto drill pipe or tubing.

It is common practice in the rotary method of drilling wells to install rubber sleeves or bearings, generally known as drill pipe or casing protectors, on the drill pipe to reduce friction and wear on the outer surface of the pipe joints and the inner wall of the casing. The split type protectors as opposed to the all-rubber cylindrical or stretch-on type, are made with a longitudinal slit or opening on one side, and with a cylindrical metal sleeve or insert embedded in the rubber for reinforcement, the lateral ends of the metal being bent back and formed into interlocking loops, and reinforced with parallel bars adjacent to the loops which serve also as a means of engagement for the gripping jaws of the installing tools. When the protector is constricted about the pipe, a locking pin is inserted through the lined-up, interlocking loops to hold the protector in engagement with the pipe after the constricting tool is removed.

In addition to the initial installation of protectors, a constricting tool is also required for removal and reinstallation, removal being frequently desired when storing pipe, when drilling in uncased or open hole, or when transferring rubbers from one string of pipe to another.

Heretofore, one common method for constricting split pipe protectors has involved the use of a pliers-type tool and a great amount of manual labor.

Accordingly, it is a primary object of the present invention to provide an applicator tool which is lightweight and efficient to use.

Another object of the invention is to provide an applicator tool which can be operated by fluid power.

An additional object of this invention is to provide an applicator tool easily operable by one man, whether the pipe is in a horizontal position on a pipe rack, or in a vertical position in the derrick.

Still another object of the invention is to provide a protector applicator tool adaptable to split protectors of any size.

Yet another object of the invention is to provide a tool, the jaws and other components of which may be readily replaced when worn or damaged; and further that disassembly and reassembly of the components may be accomplished without disturbing the fluid end of the tool, thus precluding loss of power fluid.

A further object of this invention is to provide an applicator tool adjustable for optimum constriction when the pipe is oversize or undersize or when the tool jaws or the protectors are worn.

A still further object of the present invention is to provide an applicator tool, the jaws of which return to their initial positions ready for re-use following each constriction.

Briefly, the invention embraces a tool for constricting about a pipe a flexible split protector which comprises: a sleeve; a first jaw fixed to the sleeve; a second jaw; means for mounting the second jaw on the sleeve for movement toward the first jaw, the means comprising a member slidable in the sleeve, the member being fixed to the second jaw; a cylinder threaded to the sleeve; a piston slidable in the cylinder for sliding the member in the sleeve; means for sliding the piston; and mutually abutting stop members on the piston and the cylinder limiting movement of the piston, whereby the spacing between the stop member on the cylinder and the first jaw may be varied by the threaded engagement of the cylinder to the sleeve thereby to vary the spacing of the jaws when the stop members are in abutment. Means are also included for adjusting, removing, and replacing the jaws without disassembly of the piston, the cylinder, and the bushing.

Further objects and advantages will appear as the invention is described with greater particularity in the following detailed description taken with the accompanying drawings.

In the drawings:

FIG. 3 is an enlarged longitudinal sectional view of the tool taken on the line 3—3 of FIG. 1 and looking in the direction of the arrows, showing the tool engaging a protector prior to constriction;

FIG. 4 is a view similar to FIG. 3, but showing the piston extended and the jaws having constricted the protector to its closed position on the drill pipe;

Like reference characters in the various figures of the drawings and in the following description designate corresponding parts.

Figure 1:
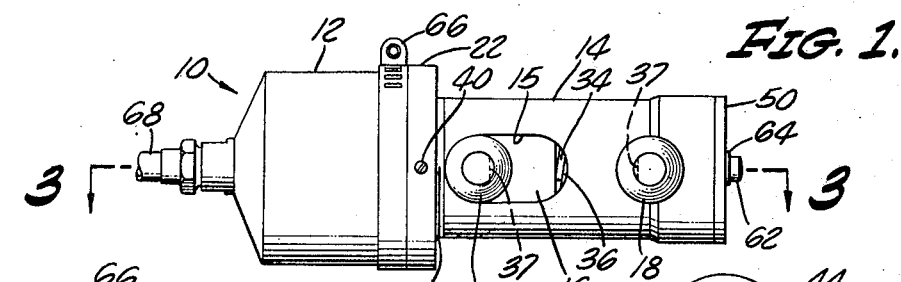
FIG. 1 is a bottom view of one form of the tool in accordance with the invention.

Referring to FIG. 1 there is shown an applicator tool 10 according to the present invention, with the power fluid line 68 connected to the cylinder 12, which in turn is connected by the bushing 22 to an outer sleeve 14, to which is affixed a first or stationary jaw 18 in line with a longitudinal slot 15 in the periphery of the outer sleeve. Through the slot 15 passes a second or traveling jaw 20 affixed to an inner sleeve 16 and aligned with the first jaw 18 by a guide rod 34, the two jaws being urged normally apart by a spring 36.

Figure 2:
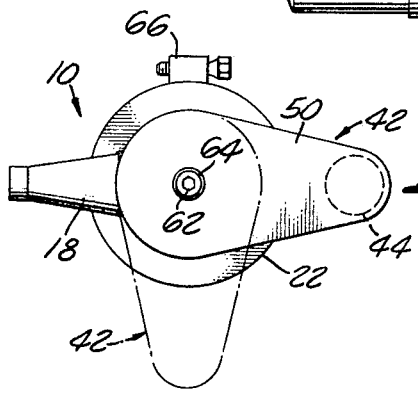
FIG. 2 is an end view of the tool showing the handle in its normal position opposite the jaws, and in phantom view the handle in one of its optional positions at right angles with the jaws.

Referring to FIG. 2, the end view of the tool 10 shows the handle 42 in the normal position in line with and 180° from the jaws 18 and 20, and held in place by means of a clamp 66 and a screw 62 with its washer 64. The handle 60 is also indicated in phantom in one of two alternate left- or right-hand positions at 90° from the plane of the jaws 18 and 20.

In FIGS. 3 and 4 are shown the internal parts of the tool 10. A piston 24 is sealed inside the cylinder 12 by means of an O-ring 26, backed up in a groove 27 by back-up rings 28, and urged in a direction away from the sleeve 16 by a spring 30 engaged in a piston recess 25 and a guide-plate recess 33 of a guide plate 32, with its breather hole 31 and center hole 29, through which passes the small end 35 of the guide rod 34, the latter also passing through a hole 21 of the jaw 20 and into a recess 19 of the jaw 18, maintaining the jaws in alignment. The spring 36 is centered by means of grooves 17 in the first jaw 18 and urges the second jaw 20 away, maintaining the jaws in a normally open position as shown in FIG. 3, the jaw 20 being aligned in this position with a knock-out hole 13 in the outer sleeve 14. The handle 42 is shown installed in its normal position as in FIG. 2, its saddle 48 clamped onto the cylinder 12 by means of the clamp 66 and its back base 50 attached to the first jaw 18 by means of a screw 62, the guide yoke 52 (see also FIG. 6) centering coaxially inside the sleeve 14 and the grooves 53 of the guide yoke 52 and the grooves 57 of a support 56 maintaining the handle in line with the jaws 18 and 20; optional left-hand or right-hand alignment of the handle at 90° to the jaws is accomplished by engaging the grooves 54 and 58 with the stationary jaw 18. An adjusting set screw 40 in the bushing 22 is shown urging a plastic plug 38 against the threads 23 of the outer sleeve 14 to lock the latter in the desired engagement with the bushing. The lips 37 of the jaws 18 and 20 are shown in engagement with the insert bars 76 of the insert band 74 of a drill pipe protector 72 to be installed on a drill pipe 70, the jaws passing through a pair of lateral access holes 78 in the protector 72 to bring the protector tongues 80 in alignment with the protector grooves 82, and the loops 86 in alignment with each other for insertion of a locking pin 84.

Figure 5:
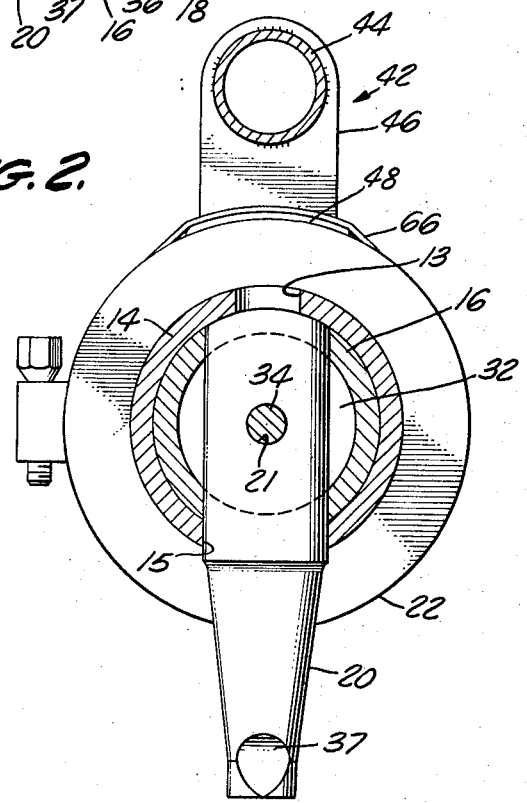
FIG. 5 is a sectional view taken on the line 5—5 of FIG. 3 and looking in the direction of the arrows.

Referring now to FIG. 5, the traveling jaw 20 with its lip 37 is held in place in the inner sleeve 16 by the guide rod 34, and is slidable over the guide rod, which is inserted through the hole 21 of the jaw. The inner sleeve 16 is slidable inside the outer sleeve 14, the jaw 20 sliding longitudinally in the slot 15, and the hole 13 being provided for knocking out the jaw 20 from the sleeve 16 after removal of the rod 34. The outer sleeve 14 is screwed into the bushing 22. The clamp 66 clamps over the saddle 48 of the handle 42 to hold it in place.

Figure 6:
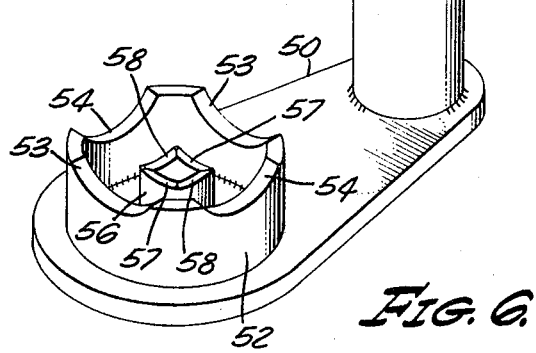
FIG. 6 is an enlarged perspective view of the handle weldment.

Referring to FIG. 6, the detail of the handle weldment 42, to one end of the tubular grip 44 is attached a front brace 46 with its saddle 48 curved to fit the outside of the cylinder 12; to the other end of the grip is attached a back brace 50 with its guide yoke 52 and concentric support 56. The yoke and support are concentrically milled with grooves 53 and 57 respectively to fit the cylindrical shape of the stationary jaw 18, and similarly milled with concentric grooves 54 and 58 to provide alternate handle positions at 90° from the standard position.

Based on a typical procedure, a brief description of the operation of the tool of this invention is presented, with reference to the several figures. Referring to FIG. 3, a split drill pipe protector 72 is spread open and around a drill pipe 70, the jaws 18 and 20 of the tool 10 inserted into the protector access holes 78 so that the lips 37 of the jaws engage the outer edges of the parallel longitudinal insert bars 76 connected near the interlocking end loops 86 of the insert band 74. Fluid under pressure from an outside source (not shown) enters through the fluid line 68 into the cylinder 12 behind the piston 24, moving the latter against the inner sleeve 16 to which is attached the traveling jaw 20, forcing the latter toward the stationary jaw 18, thus reducing the distance between the jaws and drawing toward one another the bars 76 to constrict the protector 72 until the tongues 80 are interlocked and the correspondingly aligned grooves 82 and the loops 86 are interengaged and aligned for insertion of a locking pin 84 as in FIG. 4.

The protector 72 now being installed on the pipe 70, fluid is released through the line 68 by means of a valve (not shown) from the inside of the cylinder 12, allowing the piston 24 to return, urged by the spring 30, to its original position as in FIG. 3, and the inner sleeve 16 and the traveling jaw 20 to return, urged by the spring 36, to their original positions as in FIG. 3. The tool 10 may then be removed and the cycle repeated for the installation of additional protectors. Breather hole 31 through the guide plate 32 is provided for egress and ingress of air during movement of piston 24.

If the pipe 70 is oversize or undersize, or the jaw lips 37 or the bars 76 worn, it is sometimes required to adjust the constricted distance between the lips 37 in order to provide alignment of the insert loops 86 for insertion of the locking pin 84. The closing movement of the traveling jaw 20 and the inner sleeve 16 to which it is attached is limited by travel of the piston 24 until the latter is stopped against the bushing 22; so the constricting space between the jaw lips 37 may be increased or reduced by screwing the thread 23 of the outer sleeve 14 to which the jaw 18 is attached farther out of or into the bushing 22. The outer sleeve is then held in the adjusted position by forcing the plastic plug 38 against the thread 23 by means of the set screw 40.

The handle 42 may be rotated 90° either clockwise or counterclockwise for right-hand or left-hand orientation by loosening the clamps 66 and the screw 62, and aligning the grooves 54 and 58 of the guide yoke 52 and the support 56 with the jaw 18, and then re-tightening the clamp and the screw.

In the illustrative embodiment of the invention herein shown and described, the outer sleeve 14 and its associated parts, including the inner sleeve 16, the jaws 18 and 20, and the jaw return spring 36, may be unthreaded as a unit from the bushing 22, after removal of the handle weldment 42. When these parts are removed from the subassembly, including the cylinder 12, the piston 24, and the bushing 22, the piston is retained in the cylinder by the bushing to prevent loss of hydraulic fluid from the chamber in back of the piston. The parts associated with the outer sleeve 14 may then be conveniently repaired or replaced.

While one form of the tool has been shown by way of illustration, it should be understood that various modifications will occur to one skilled in the art. The inner sleeve 16 could be detachably secured to the piston 24. Other modifications of the illustrative form of the present invention would involve the retraction of the piston 24 and the second jaw 20 by fluid power rather than mechanically; and adjustment of jaw constriction spacing between the lips 37 by use of an adjustable limit stop for the traveling jaw 20 or the inner sleeve 16, rather than by limiting the travel of the piston 24 and adjusting the position of the stationary jaw 18. Alternately, also, the bushing 22 could be made an integral part of either the outer sleeve 14 or of the cylinder 12, still providing a stop to limit the travel of the piston 24.

I claim:
1. A tool for constricting about a pipe a flexible split protector which comprises:
 (a) a sleeve;
 (b) a first jaw fixed to said sleeve;
 (c) a second jaw;
 (d) means for mounting said second jaw on said sleeve for movement toward said first jaw, said means comprising a member slidable in said sleeve, said member being fixed to said second jaw;
 (e) a cylinder threaded to said sleeve;
 (f) a piston slidable in said cylinder for sliding said member in said sleeve;
 (g) means for sliding said piston; and
 (h) mutually abutting stop members on said piston and said cylinder limiting movement of said piston, whereby the spacing between said stop member on said cylinder and said first jaw may be varied by the threaded engagement of said cylinder to said sleeve thereby to vary the spacing of said jaws when said stop members are in abutment.

2. A tool for constricting about a pipe a flexible split protector which comprises:
(a) a first sleeve;
(b) a first jaw fixed to said first sleeve;
(c) a second sleeve slidable in said first sleeve;
(d) a second jaw fixed to said second sleeve;
(e) a bushing threaded to said first sleeve;
(f) a cylinder threaded to said bushing;
(g) a piston slidable in said cylinder for sliding said second sleeve in said first sleeve;
(h) means for sliding said piston, said bushing providing a stop to limit the movement of said piston and thereby the movement of said second sleeve, whereby the spacing between said stop and said first jaw may be varied by the threaded engagement of said first sleeve to said bushing, thereby to vary the spacing of said jaws when said piston abuts said bushing;
(i) guide means providing lineal alignment of said jaws; and
(j) spring means to retract said piston and said second jaw following movement by said sliding means.

3. A tool for constricting about a pipe a flexible split protector which comprises:
(a) a first sleeve;
(b) a first jaw fixed to said first sleeve;
(c) a second sleeve slidable in said first sleeve;
(d) a second jaw fixed to said second sleeve;
(e) a bushing threaded to said first sleeve;
(f) a cylinder threaded to said bushing;
(g) a piston slidable in said cylinder; and
(h) means for sliding said piston, said bushing providing a stop to limit the movement of said piston, whereby the spacing between said stop and said first jaw may be varied by the threaded engagement of said first sleeve to said bushing, thereby to vary the spacing of said jaws when said piston abuts said bushing.

4. A tool for constricting about a pipe a flexible split protector which comprises:
(a) a first sleeve;
(b) a first jaw attached to said first sleeve;
(c) a second sleeve slidable in said first sleeve;
(d) a second jaw attached to said second sleeve;
(e) a bushing threaded to said first sleeve;
(f) a cylinder threaded to said bushing;
(g) a piston slidable in said cylinder for sliding said second sleeve in said first sleeve;
(h) means for sliding said piston, said bushing providing a stop to limit the movement of said piston and thereby the movement of said second sleeve, whereby the spacing between said stop and said first jaw may be varied by the threaded engagement of said first sleeve to said bushing, thereby to vary the spacing of said jaws when said piston abuts said bushing; and
(i) means for adjusting, removing, and replacing said jaws without disassembly of said piston, said cylinder, and said bushing.

References Cited
UNITED STATES PATENTS

| | | | |
|---|---|---|---|
| 2,183,842 | 12/1939 | Mandl | 29—252 |
| 2,736,294 | 2/1956 | Buehner | 254—93 X |
| 2,947,275 | 8/1960 | Edmonds | 254—93 X |
| 3,038,247 | 6/1962 | Clark | 29—252 X |
| 3,150,859 | 9/1964 | Payne | 254—51 |

OTHELL M. SIMPSON, *Primary Examiner.*

J. C. PETERS, *Assistant Examiner.*